United States Patent [19]

Miller et al.

[11] Patent Number: 5,524,545
[45] Date of Patent: Jun. 11, 1996

[54] PROCESS AND APPARATUS FOR PHOTOLYTIC DEGRADATION OF EXPLOSIVES

[75] Inventors: Paul L. Miller, Minnetonka; Gary G. Wittmer, New Hope; Mark D. Stignani, Minneapolis, all of Minn.

[73] Assignee: Global Environmental Solutions, Inc., Hopkins, Minn.

[21] Appl. No.: 475,520

[22] Filed: Jun. 7, 1995

Related U.S. Application Data

[62] Division of Ser. No. 299,840, Sep. 1, 1994, which is a division of Ser. No. 752,851, Aug. 30, 1991, Pat. No. 5,370,845.

[51] Int. Cl.$^6$ .............................. B09B 3/00; F42B 33/00
[52] U.S. Cl. ............................................ 102/293; 588/900
[58] Field of Search ............................ 102/293; 588/202, 588/203, 900

[56] References Cited

U.S. PATENT DOCUMENTS

| | | | |
|---|---|---|---|
| 1,969,655 | 8/1934 | Mailey | 23/252 |
| 3,312,231 | 4/1967 | Monroe et al. | 134/111 |
| 3,440,096 | 4/1969 | Scott | 134/24 |
| 3,476,669 | 11/1969 | Beckman et al. | 204/193 |
| 3,968,723 | 7/1976 | Flaterman et al. | 86/1 A |
| 4,038,116 | 7/1977 | Andrews et al. | 149/105 |
| 4,144,152 | 3/1979 | Kitchens | 204/158 R |
| 4,252,537 | 2/1981 | Cattran et al. | 23/230 |
| 4,276,100 | 6/1981 | Coluin et al. | 149/109.6 |
| 4,345,646 | 8/1982 | Terrell | 166/55 |
| 4,376,666 | 3/1983 | Williams, Jr. | 149/109.6 |
| 4,517,063 | 5/1985 | Cirjak | 204/157.1 |
| 5,037,524 | 8/1991 | Juvan | 204/307 |
| 5,124,051 | 6/1992 | Bircher et al. | 210/748 |
| 5,133,945 | 7/1992 | Hallpit | 422/186.3 |
| 5,260,036 | 11/1993 | Weigold et al. | 422/186.3 |
| 5,284,995 | 2/1994 | Melvin | 588/203 |
| 5,331,106 | 7/1994 | Spas | 588/202 |
| 5,366,015 | 11/1994 | Surjaatmadja et al. | 166/298 |

OTHER PUBLICATIONS

Military Explosives, Departments of the Army Technical Manual TM 9–1300–214, Department of the Air Force Technical Order TO 11A–1–34, Nov. 28, 1967.

Testing to Determine Chemical Stability, Handling Characteristics, and Reactivity of Energetic–Fuel Mixtures, M. E. Lackey, Apr. 1988.

Utilization of Energetic Material as a Supplementary Boiler Fuel, by E. C. Fox et al., Oct. 23–25, 1985.

Pilot–Scale Testing of a Fuel Oil–Explosives Cofiring Process for Recovering Energy from Waste Explosives, Aug. 1988.

Use of Waste Energetic Materials as a Fuel Supplement in Utility Boilers, Craig A. Myler et al., 1989.

Laboratory Tests to Determine the Chemical and Physical Characteristics of Propellant–Solvent–Fuel Oil Mixtures, V. M. Norwood et al, Feb. 1990.

*Primary Examiner*—Donald P. Walsh
*Assistant Examiner*—Daniel Jenkins
*Attorney, Agent, or Firm*—Merchant, Gould, Smith, Edell, Welter, & Schmidt

[57] ABSTRACT

A process for photolytic degradation of the organic and nitrogenous components of high explosives in organic solvent is described. The process can be applied with a module photolytic apparatus so that munitions can be destroyed without endangering the environment or toxifying large quantities of water. An apparatus is also disclosed.

1 Claim, 5 Drawing Sheets

PROCESS AND APPARATUS FOR PHOTOLYTIC DEGRADATION OF EXPLOSIVES

This is a division of application Ser. No. 08/299,840, filed Sep. 1, 1994, which is a division of application Ser. No. 07/752,851, filed Aug. 30, 1991, now U.S. Pat. No. 5,370,845 which application(s) are incoporated herein by reference.

BACKGROUND OF THE INVENTION

The explosive power of so-called secondary explosives and certain initiating explosives used in most modern munitions has been developed to a remarkable degree of destructiveness. This is due in part to the use of several components in the explosive. Consequently, not only are the primary detonation products factors generating the destructive force but also the secondary combustible gases and heat of reaction. The former are produced by the metastable nitrogenous and organic compounds present. The latter are produced by metal powders and oxidizers incorporated into the explosive.

Processes for disposing of such secondary explosives in munitions have typically involved non-confined detonation, incineration, or open burning. To obtain the explosive from the munitions, the munitions are often opened by sawing or mechanical cleaving. This process enables reclamation of the metal munition housings or shell. However, aside from being very dangerous, these techniques result in release of large quantities of toxic and/or otherwise undesirable compounds into the air, ground and ground water.

Disposal efforts have also included slicing the munitions open and washing out the explosive with water. This process results in contamination of large quantities of water with the recovered explosive and explosive by products. This water is toxic to aquatic life and cannot be returned to the environment without removal of the explosives. Some effort has been devoted to development of methods to remove these explosives from water. In particular, activated carbon such as carbon black or charcoal will absorb much of the explosive and has been used to treat the water solutions formed by washing the explosive from the opened munitions. Not all of the explosive is removed from the water, however. Moreover, the carbon treatment results in additional processing of the carbon which can retain as much as 0.5 grams of explosive per kilogram of carbon.

Several other processing methods have been proposed for treatment of the explosive waste water. Photolysis by ultraviolet irradiation of the explosive-laden water will cause degradation of the explosive compounds to neutral and stable compounds such as ammonia and carbon dioxide. Typically, the ultraviolet photolysis can be catalyzed with free radical sources such as ozone or hydrogen peroxide to facilely produce unstable intermediates from the explosives.

This development of degradative processes for explosives is exemplified by Andrews et al, U.S. Pat. No. 4,038,116, which discloses a method for degrading aromatic explosive solutions such as nitrotoluenes, nitramines, and other explosives through the application of ultraviolet energy. Andrews notes that the degrading reaction may be catalyzed by the induction of reactive intermediates through the use of free radical initiators such as acetone or hydrogen peroxide. The Andrews process ultimately produces such byproducts as carbon dioxide and ammonia. However, Andrews initiates his process by "solubilizing" the explosives into a water solution and mixing it with the reactive intermediate.

Problems of the Andrews process include the low, almost null solubility, of organic explosives in aqueous solvent (in the magnitude of 10 ppm). Furthermore, the batch mode processing of Andrews means that a portion of the aqueous explosive solution is processed by recirculation until all measurable amounts of the explosive are removed. This is a time consuming and labor intensive exercise. Wholly apart from the technical problems, the negligible solubility of explosive in water breeds significant impracticibilities because vast quantities of water would be required for processing. Therefore, any sort of modular water reactor system for on-site treatment of weapons caches could not be developed. Moreover, the rate of destruction of the explosives is limited due to the very small concentrations of the explosive in the aqueous system. As a result, the method of Andrews et al as well as other aqueous based processes for degradation of explosives fail to provide continuous processing of the explosives.

Such aqueous treatment systems for disposal of munitions are dangerous as well. The addition of water to explosives in the context of a system having the potential for oxidation and generation of heat often provides just that element needed to cause spontaneous combustion or explosion of the munition. This element is especially prevalent when metal powder is present as it is in most modern explosives. The metal powder is often encapsulated by a coating agent such as a fatty acid salt. The encapsulation prevents spurious contact of water and the metal powder but also prevents appropriate aqueous treatment and separation. Moreover, when an aqueous disposal system does penetrate to the surface of the metal powder, the result is often a conflagration. The metal powder is highly reactive with the water. In other respects, however, an aqueous system would seem to be the safest. Its non-combustibility in the presence of flame, heat and sparks would minimize the accidental incineration of the explosive.

Therefore, it is an object of the invention to provide a process for degradation of explosive organic compounds or munitions that enables the use of continuous processing of more concentrated forms of explosive. A further object is the development of a safe process that avoids the explosive potential of aqueous systems. Yet another object is the development of an integrated process for removing the explosive from the munition and converting it to non-explosive chemicals.

SUMMARY OF THE INVENTION

These and other objects are achieved by the present invention which is directed to a process and apparatus for safe conversion of high explosives into non-explosive byproducts. The process is based upon the use of organic solvent to dissolve or disperse the organic components of the explosive, prevent reaction of the powdered metal components with water and enable the photolysis of the nitrogenous and organic explosive components. The apparatus includes components for removing the explosive, for dissolving or slurrying it and for irradiating the solution or slurry.

In a first aspect of the process, a pressurized jet or stream of organic solvent opens the munition to expose the explosive, removes the explosive from the munition and forms a mixture with the explosive. Preferably, the jet of organic solvent is continuous and/or carries a particulate abrasive.

In a second aspect of the process, the mixture (solution or slurry) of organic solvent and nitrogenous and organic components of the explosive is photolyzed under ultraviolet conditions within a region of the UV spectrum where the explosive absorbs energy. The photolysis degrades the explosive to non-explosive byproducts such as carbon dioxide, water and nitrogen. The byproducts may be readily removed from the organic solvent owing to their differing phase or low solubility in the solvent.

Several versions of the process are available including an integrated two stage version and a single stage version. In the integrated version of the process, the mixture produced by the solvent jet is directly transported to the photolysis stage preferably through a solvent recycle loop. In a single stage, the explosive is typically in bulk rather than packed in a munition. The explosive is dissolved or dispersed in organic solvent and the resulting mixture is photolyzed.

Mixtures of solvent can be employed at the various stages of the processes so that a solvent appropriate for jetting and cutting is thereafter combined with a solvent which will dissolve or disperse significant amounts of the organic components. With all versions, the solvent(s) can be recycled and can be applied or used under various conditions of temperature and pressure. These options provide for high temperature, high pressure operations that will favor increased solubility of the explosive in the solvent.

The apparatus generally includes components in fluid connection for accomplishing the processing steps. In particular, the apparatus is the combination of a variable high pressure cutting and excavating jet component, a collection vessel for the excavated explosive and solvent, a pumping means for transporting the solution or slurry among the components and a UV reactor for irradiation of the solution or slurry.

Accordingly, the invention provides a continuous system process and apparatus for converting highly concentrated solutions of explosives to non-explosive byproducts. The process and apparatus enable a modular processing station for the degradative conversion of explosive compounds and compositions. By using a closed system, the required solvent is minimized and the potential for environmental contamination is substantially eliminated. Furthermore, the use of organic solvent eliminates the hazard of explosion attendant with the use of aqueous systems for degradation of explosives.

DETAILED DESCRIPTION OF THE INVENTION

The present invention for disposal of modern explosive mixtures virtually eliminates accidental conflagration which can be caused by reaction of water and the metal powder component of the explosive. The organic solvent used to dissolve the nitrogenous and organic components of the explosive acts as a liquid barrier to prevent contact of the metal powder with water either in the air, from degradation of the nitrogenous organic components of the explosive, or as a minor ingredient of the solvent itself. At the dissolution step, the metal powder is separated from the organic components of the explosive, such as by agglomerating on the bottom of the separatory vessel, and can be transported to another vessel for safe disposal.

Explosive, in the context of the invention, means any secondary chemical explosive or other chemical compound or composition found in munitions which is capable of deflagration by shock from a primary explosive so that rapid production of large quantities of hot gas results or selected primary explosives that have functions other than exclusively as detonators. These explosives exhibit absorption in the ultraviolet spectral band. Examples of such chemicals include ammonium nitrate (AN), ammonium perchlorate (AP), benzotris[1,2,5]-xadiazole, 1,4,7-trioxide (BTF), 2,4,6-trinitro-1,3-benzenediamine (DATB), 2,2'-oxybisathanol, dinitrate (DEGN), 2,2',4,4',6,6'-hexanitro-[1,1-biphenyl]-3,3'-diamine (DIPAM), 2,2-dinitropropyl acrylate (DNPA), ethyl 4,4-dinitropentanoate (EDNP), ethylene glycol dinitrate (EGDN), ammonium picrate (Explosive D), 1,1'-[methylenebis(oxy)]bis-[2-fluoro-2,2-dinitroethane] (FEFO), octahydro-1,3,5,7-tetranitro-1,3,5,7-tetrazocine (HMX), bis(2,4,6-trinitrophenyl)diazene (HNAB), 1,1'-(1,2-ethenediyl)bis-[2,4,6-trinitrobenzene] (HNS), nitroguanidine (NQ), nitroglycerine (NG), 2,4,6-trinitrophenol (picric acid), hexahydro- 1,3,5-trinitro-1,3,5-trazine (RDX), 2,4,8,10-tetranitro-5H-benzotriazolo-[ 2,1-a]-benzotriazol-6-ium, hydroxide, inner salt (TACOT), 2,4,6-trinitro-1,3,5-benzenetriamine (TATB), N-methyl-n,2,4,6-tetranitrobenzenamine(tetryl), tetranitromethane (TNM), 2-methyl-1,3,5-trinitrobenzene (TNT), and others including cast explosives, plastic bonded explosives and other miscellaneous explosives which may be the product of one or more of the previously mentioned compounds or other derivatives in the form of a single compound, a mixture of these compounds, or the reaction product of these compounds.

Other compounds which may also be processed in accordance with the invention disclosed herein include propellants which tend to be mixtures of such compounds as sulfur, carbon and potassium nitrate (black powder), dinitrotoluene, propylene glycol dinitrate, otto fuel, trinitrotoluene, nitroglycerine, nitroguanidine, dibutylpthhalate, triacetone, among other constituents. Also included are certain primary explosives such as NG, DEGDN and EGDN.

The explosive also may contain finely divided metal and/or combustible inorganic powder usually encapsulated in a fatty acid salt or other barrier coating. The metals and inorganics include any that will rapidly or even spontaneously combust in air or water. Included are zinc, magnesium, aluminum, zirconium, iron, antimony, boron, as well as other combustible metals. The metal powders are treated to remove oxide coatings that prevent decomposition and coated in an inert atmosphere to avoid reintroduction of the oxide coat. Because of their high surface area and non-oxidized surfaces, the metal and inorganic powders are highly reactive. Their reaction especially with water generates hydrogen which acts as an incendiary element in the munition.

The organic solvent for the process produces mixtures (solutions or slurries) of the nitrogenous and organic components of the explosive. The solvent is chosen so that the nitrogenous and organic components are at least significantly soluble and/or dispersable in the solvent. The organic solvent is preferably a polar, non-hydroxylic organic compound that is transparent to visible and ultraviolet light although it may exhibit some absorption within some but not all regions of the selected ultraviolet region. Generally, the organic solvent may be chosen from alkyl alcohols, alkyl ketones, alkyl nitriles, nitro alkanes and halo-alkanes provided that the solvent does not substantially polymerize under ultraviolet irradiation conditions or act as a black solvent, i.e. absorb strongly within the ultraviolet region of the photolysis. Organic solids that will liquify at temperatures slightly above ambient are included as organic solvents as well as organic liquids and gases that can be maintained as liquids under moderate or high pressure and moderate or high temperature conditions. More particularly, the alkyl group of the organic solvent may be a branched, cyclic or straight chain of from three to about twenty carbons. Examples of such alkyl groups include octyl, dodecyl, propyl, pentyl, hexyl, cyclohexyl and the like. The alcohols may be composed of such alkyl groups as long as they meet the liquid definition mentioned above. The ketones include such solvents as acetone, cyclohexanone, propanone and the like as long as they meet the liquid definition mentioned above. The nitrile compounds include such solvents as acetonitrile, propyl nitrile, octyl nitrile and the like. Examples of halogenated alkanes include methylene chloride, chloroform, tetrahaloethylene or perhaloethane and the like. Mixtures of the foregoing individual organic compounds can also function as the organic solvent. Since some solvents function better as cutting agents while others function better as dissolving agents, a preferred technique is the use of one or a mixture of particular organic compounds as the cutting and removal solvent and another compound or mixture as the photolysis solvent. Although the cutting and removal solvent can be evaporated and replaced by the photolysis solvent, it is preferred to add the photolysis solvent to the cutting and removal solvent before the removed organic explosive components are photolyzed. Mixtures are especially preferred when the photolysis solvent exhibits some ultraviolet absorption such as often occurs with the ketone solvents. Especially preferred mixtures include gasoline or diesel fuel or long chain hydrocarbons as the cutting and removal solvent and short chain saturated alcohols, nitriles, halogenated alkanes and ketones such as acetone, acetonitrile, propanone, ethanol and propanol as the photolysis solvents. Organic compounds that act as photolysis inducers may also be incorporated in mixture with the organic solvent. Such compounds include olefins and aromatic olefins such as cyclohexene, octene, stilbene and the like.

The photolytic stage of the present invention functions to convert the nitrogenous and organic explosive components to non-explosive compounds without the use of further photolytic inducing agents such as free radical initiators, photolytic inducers and the like. Preferably, however, the photolysis is conducted in the presence of a free radical initiator. It has been found that the rate of reaction as well as the quantum yield are increased under the influence of a free radical initiator. Such initiators function as a ready source of free radicals and do not require significant input of energy for this generation. The free radicals produced include hydrogen, hydroxyl, oxygen and sulfur containing radicals. Sources include inorganic and organic peroxides, organic compounds which form stable radicals and have labile hydrogens such as allyl alcohol, benzophenone, unsaturated ketones and the like, and persulfites as well as persulfates. Other free radical initiators which may be used in this invention include chlorinated trisodium phosphate, potassium peroxy diphosphate, sodium peroxytoluene sulfonchloramine, potassium peroxy monosulfonate, peracetic acid, ozone and hydrogen peroxide.

Photolytic inducers can also be included in the photolysis mixture. Such inducers efficiently absorb ultraviolet light and transfer it to the explosive organic components in the form of triplet energy. Such inducers include ozone, hydrogen peroxide, benzophenone, stilbene, naphthalene, acetophenone and other highly conjugated organic compounds.

Munition Evacuation

According to the process of the invention, the removal stage generally encompasses eroding, excavating or evacuating the explosive from the munition. After separating the munition from the propellent casing, if necessary, the munition housing (hereinafter casing) is opened to expose the explosive as well as to dissolve or slurry the nitrogenous and organic components of the explosive in a liquid organic medium.

Generally, any number of techniques may be used to open the casing such as milling, sawing, abrasive cutting, crushing or shearing. Some are clearly more dangerous than others considering that high explosives are involved. A preferred technique has been developed according to the invention. This technique is relatively safe because it does not depend upon heat, compressive pressure or a technique that could produce a spark. According to the invention, the technique calls for application of a steady high pressure jet or stream of the organic solvent to the casing. The jet or stream cuts through the casing with minimum generation of heat, compressive pressure or sparks.

Optionally, an abrasive may be entrained in the organic solvent. For example a particulate abrasive may be aspirated into the jet of solvent through an aspirating inlet at the pressure head. Abrasives which are useful in accordance with the invention include carborundum, silica, alumina, ceramic dust, beryllia powder as well as any hard sharp-edged particulate matter.

Generally, solvent pressures ranging from about 1,000 psi to about 500,000 psi, preferably from about 20,000 psi to 60,000 psi, and most preferably from about 35,000 psi to 50,000 psi will cut through the casings to expose the explosives. In the process of opening the casing, the jet is directed to cut a line almost completely through the casing such that the line divides the casing in two parts. Preferably, the pressure of the jet is decreased when the jet has penetrated the casing thickness to an appropriate limit of safety. Although the jet technique is safer than other techniques, this safety range will prevent the kinetic energy created by the jet from detonating the explosive. A preferred safety factor is penetration through about 95% of the casing thickness. The jet pressure for cutting the remaining thickness can be significantly decreased so that accidental kinetic detonation is avoided.

Any of the organic solvents described above that are or will be liquid at sub-zero to high temperature will function as the cutting and removing solvent. Aliphatic liquids and gases such as gasoline, naphtha, kerosene, and propane under pressure are also useful as such cutting and removing solvents. Preferred organic solvents are those which have a low enough viscosity and a high enough boiling temperature at the in-line pressures provided above to continue to move through the fluid delivery system and jets without clogging and without vaporizing once the jet exits the output nozzle. Organic solvents which have been found to provide preferred viscosities include diesel fuel, kerosene and gasoline, a mixture or C6 to C10 alkanes, naphtha fuel, C3 to C7 ketones and other long chain hydrocarbons.

Once the casing has been opened, the explosive may be removed. In accordance with this step of the process, the explosive may be removed from the casing by any number of means such as drilling, cutting, excavating, melting, slicing and the like with mechanical or heat producing equipment. Preferably, according to the invention, the explosive is removed (eroded, excavated or evacuated) by the jet of organic solvent without abrasive that opened the casing. The pressure of the jet is reduced to a level that will enable safe removal relative to the detonation energy level required by the explosive. In conducting the removal, the jet dissolves or disperses portions of the explosive, erodes further portions and slices portions to produce loose solid agglomerates of explosive that are excavated from the casing by the pressure of the jet. The jet of solvent may be moved around the munition casing by sweeping the flow of solvent around the casing periphery to break free the munition. Alternatively, the solvent may be applied at high pressure directly into the explosive held within the munitions casing to provide a more fine crystalline particle which tends to be more readily soluble or dispersable in the organic solvent.

The jet pressure for removing the explosive ranges from about 50 psi to 200,000 psi, preferably from about 1,000 to 60,000 psi, and most preferably from about 1,200 to 40,000 psi. The temperature for removing the explosive ranges from about −40° C. to 130° C., preferably from about 0° C. to 35° C., and most preferably from about 15° C. to 25° C., where higher temperatures contribute to higher solubility of the explosive in the solvent. A higher temperature may also add to the amount of kinetic energy present in the system and thus require a lower jet pressure for the explosive removal from the casing. Lower temperatures are preferred for desensitizing explosives during removal.

Separation of Reactive Metal

After the explosive has been removed from the casing, the reactive metal or inorganic is separated from the solvent stream before conducting the photolysis reaction.

The explosive removal of the invention may also remove the wax or other coating from the metal or inorganic powder. The metal or inorganic powder does not combust or cause incineration because contact with water and oxygen is prevented by the solvent barrier. The metal or inorganic powder cannot be carried into the photolytic reaction, however. One of the byproducts of the photolysis of the organic explosive is water which would cause an incendiary reaction with the powder. Also, the metal powder will reflect or block the UV light. Once the explosive is dissolved or slurried by mixing with organic solvent or through the jet removal process, any metals present in the explosive settle, precipitate or otherwise fall to the bottom of the vessel for collection of eroded explosive. These metals may then be left at the bottom of the vessel as an insoluble sludge while photolytic processing continues. Any suspended metal or inorganic powder may be removed by filtering or centrifuging and the like.

Waxes often present in explosive compositions may be separated by phase separation or system shocking through the addition of various solvents, temperature changes or through processing mechanisms known to those of skill in the art.

The wax and coating components present in the explosive may be dissolved by the organic solvent and carried through the photolytic step substantially unchanged since they are essentially hydrocarbons. Their disposal with the organic solvent such as by combustion can be easily obtained. If the organic solvent is recycled, the wax and coating components may interfere with the viscosity, boiling temperature and solubilizing parameters of the organic solvent. Consequently, the wax and coating components can be removed before or after, preferably after photolysis by such techniques as vacuum distillation of the organic solvent, cold phase separation by precipitation of the wax and coating components or chromatography on supports such as silica gel and the like to allow recycling of the solvent.

The Photolysis of the Explosive

According to the invention, the photolysis of the nitrogenous and organic components of the explosive converts them to harmless byproducts such as carbon dioxide, water and nitrogen. In this stage of the process, the nitrogenous and organic components are dissolved at as high a concentration as possible in the organic solvent or are dissolved and dispersed in even higher amounts as a finely divided slurry in the saturated solvent. Dispersing the components under the jet of organic solvent will avoid explosions otherwise resulting from the sensitivity of finely divided dry explosive. The solvent or solvent mixture is selected to insure solubilization and/or slurrying of the nitrogenous and organic components. The organic solvents for this purpose are characterized in the foregoing discussion. Preferred organic solvents include acetonitrile, methylene chloride, acetone, nitroethane as well as mixtures of any of these solvents or combinations.

The ratio of solvent to explosive depends upon the conversely related parameters of degradative efficiency and economies of concentration especially when processing large quantities of munitions explosives. The concentration of the nitrogenous and organic components within the organic solvent may generally be about the saturation concentration in the solvent as long as the overall system safety is not compromised or the degradative efficiency of the system is not restricted by the ability of ultraviolet light generating device to produce the needed intensity or the absorption efficiency of the solution being photolyzed. For typical photolytic conversions, the dissolved concentrations of the nitrogenous and organic components of explosives within the organic solvent at ambient conditions may range from about 0.5 wt-% to the lower of the solubility or propagation limit (the propagation limit being the concentration of explosive that will continue a detonation), preferably from about 1 wt-% to 10 wt-% especially up to 5 wt-%. In acetonitrile, for example, TNT has a saturation solubility of about 7 wt-%, RDX saturates at about 4 wt-% and HMX saturates at about 1.6 wt-%. Concentrations of dissolved explosive in organic solvent may be as high as 30 wt-% or the propagation concentration limit under temperature and pressures higher than ambient. Alternatively, slurries carrying higher than the saturation amount of explosive components (e.g., up to 30 wt-%) may be employed as long as the particulate size is small enough to assure photolytic degradation. Particles in the order of 5 to 500 microns are useful in this regard.

Once prepared, the mixture is generally metered into a UV transparent tube for exposure to an ultraviolet energy source. The transparent tube used to process the solvent/explosive composition may comprise any number of UV transparent glasses such as quartz glass, VYCOR™ (Corning Glass, Ithaca, N.Y.), fused silica, and the like.

Additionally, this transparent tube may take any variety of patterns including patterns which promote the thin film application of ultraviolet energy, a cascading pattern which allows the photolysis solution to flow over stepped flow barriers, and those systems which use reflectors to focus, concentrate, and recycle ultraviolet radiation throughout the system. Preferred glass configurations include quartz. Preferred patterns of the transparent feed path include helix or sheets.

In processing the solvent/explosive composition, any number of sources for ultraviolet light may be used. One source found preferable for its economy and ready availability is a cold cathode gas lamp such as mercury gas lamp. Also useful are mercury arc lamps, lasers or any other light source that generates spectral emission in the desired frequency range.

Generally, the ultraviolet wavelength range may be that absorbed by the nitrogenous and organic components of the explosive. Typically, ultraviolet light ranging in wavelength from about 200 to 400 nm, preferably from about 200 nm to 300 nm, and most preferably from about 240 nm to 280 nm is appropriate according to the invention. Any nitrogenous or organic component that exhibits spectral absorption in this range is susceptible to the process of the invention. However, the use of ultraviolet light of a wavelength longer than 400 nm often does not provide adequate flux and wattage for efficient degradation. The use of ultraviolet energy below 200 nm may cause the production of radical oxygen within the system and for that reason is disfavored.

The preferred source for production of ultraviolet energy in accordance with the invention is a mercury vapor lamp having approximately 7 torr partial pressure of argon and providing an ultraviolet light wavelength of 254 nanometers. This UV source has been found to be most economical, available and adaptable to the process of the invention.

Generally, the irradiation period for the solution will depend upon the explosive to be processed and its concentration. The higher the concentration, the longer will be the irradiation period for a given portion of mixture in order to achieve essentially complete conversion. Typically for tube helix configurations, irradiation periods for concentrations of 1 to 7 wt percent explosive relative to the total weight of mixture range from 5 to 30 minutes preferably from about 10 to 20 minutes and most preferably from about 12 to 17 minutes. One aspect of the invention is its continuous solvent recycling so that smaller than otherwise expected portions of solvent can be used to process large batches of explosive.

The rate of the photolytic degradation may be increased by addition of free radical initiators and photolytic inducers as discussed above. The free radical initiators and photolytic inducers may be added to the photolytic mixture when it is mixed following the removal stage or during the photolysis. The initiators readily generate free radicals which extract radicals from the explosive components thereby causing their destabilization. The inducers facilely transfer photolytic energy to the explosive components also causing their destabilization. Oxidizers can also be added. These will cause cleavage of carbon bonds so that radical destabilization and byproduct generation rapidly result. Such oxidizing compounds include those using halogens such as ozone, hydrogen peroxide, sodium hypochloride, lithium hypochloride or calcium hypochloride; isocyanurate complexes such as sodium dichloro-s-triazinetrione dihydrate, potassium dichloro-s-triazinetrione, sodium dichloro-s-triazinetrione, trichloro-s-triazinetrione; halogen hydantoin complexes such as chlorohydantoin, bromochlorohydantoin and complexes thereof.

The free radical initiators and photolytic inducers can be added at a rate ranging from about 0 to 20 wt-%, preferably from about 0.05 to 10 wt-%, and most preferably from about 0.05 to about 1 wt-%. The amount of oxidizers added to the system at any one time will vary depending upon the concentration of organic or nitrogenous component within the solvent and the desired rate of degradative photolysis.

Application of the Photolytic Process

Figure 1:
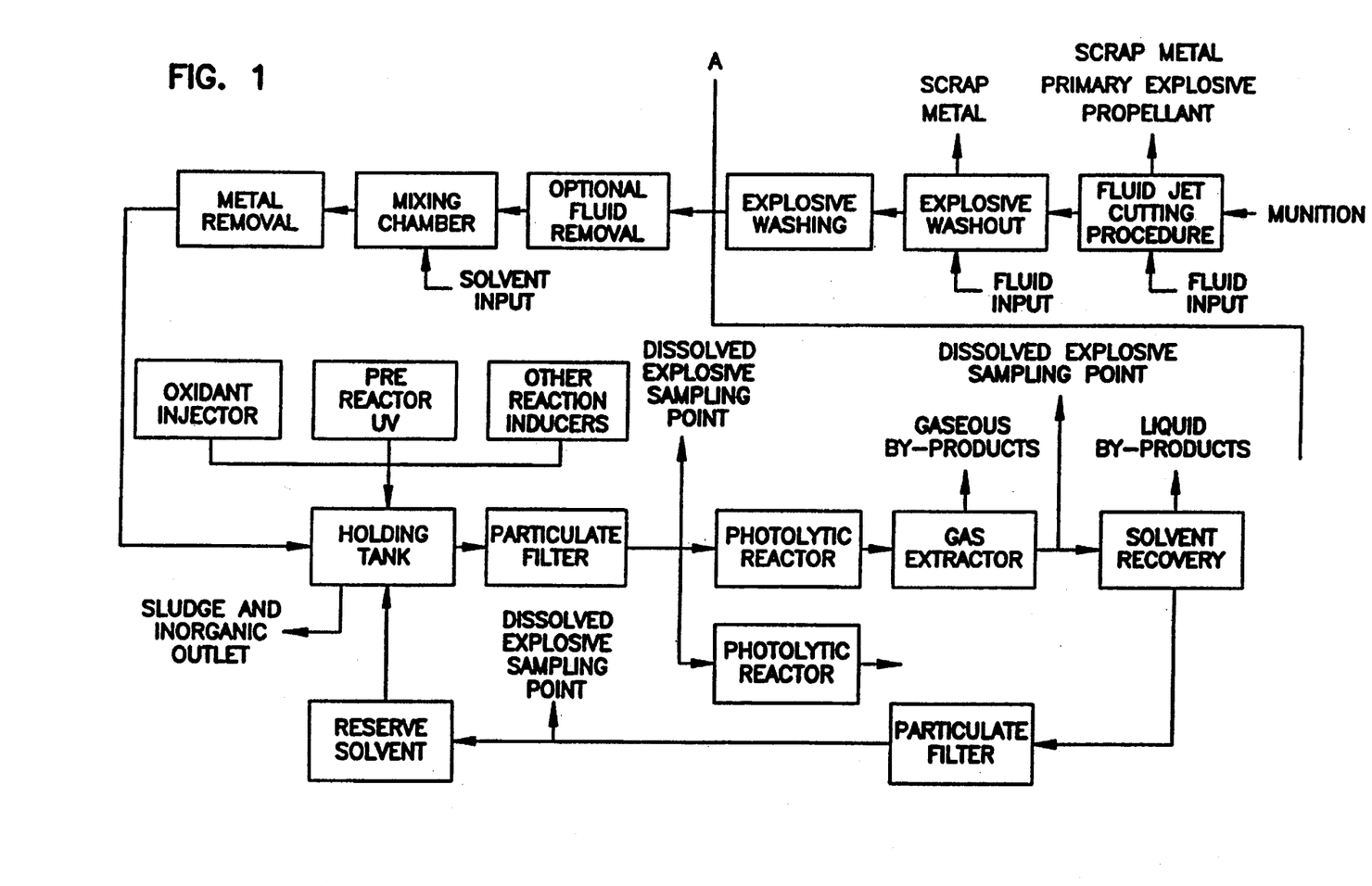
FIG. 1 is a schematic representation of the cutting and photolytic process.
Figure 2:
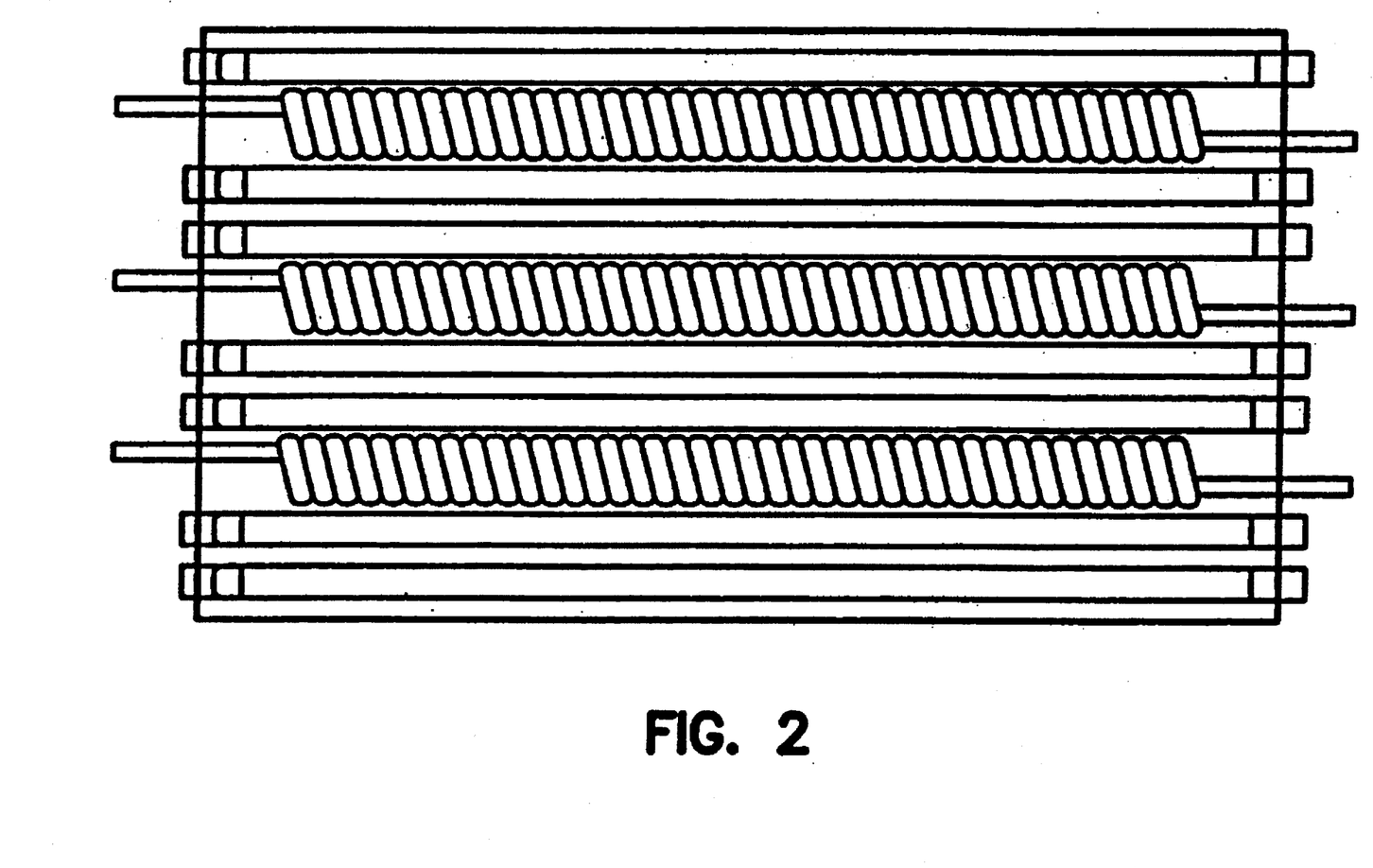
FIG. 2 is a cutaway plan view of the reactor module in accordance with one embodiment of the invention.
Figure 3:
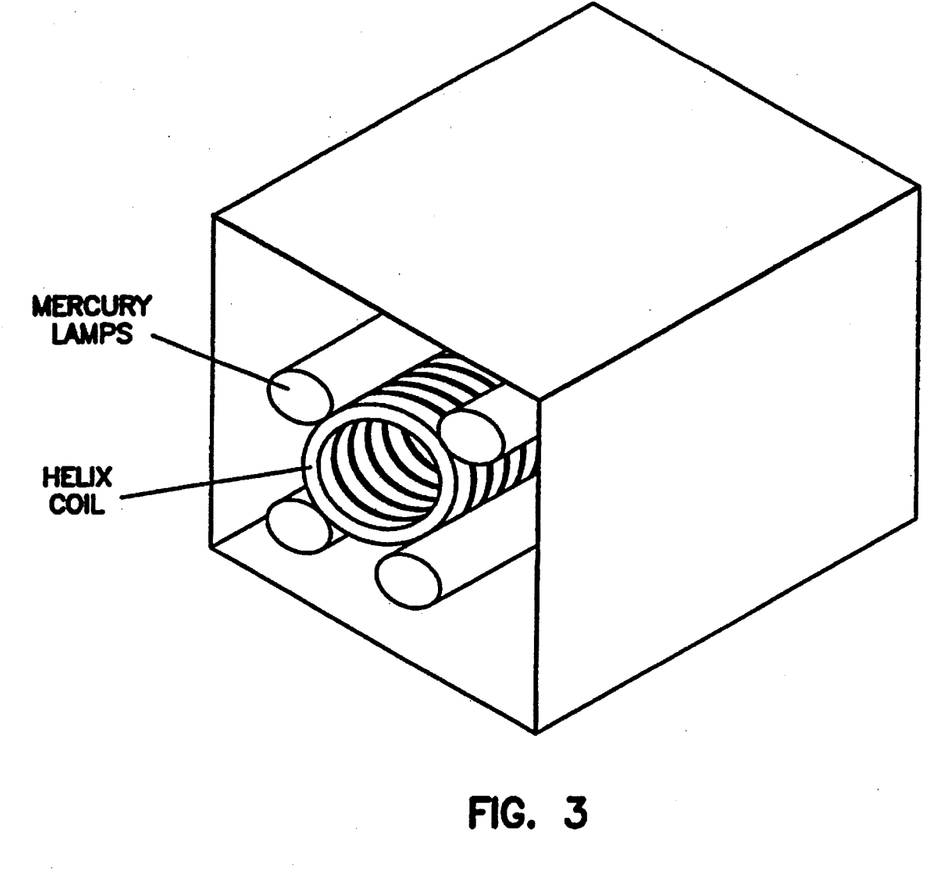
FIG. 3 is a cutaway perspective view of one embodiment of the ultraviolet lighting configuration in accordance with the invention.

As depicted schematically in FIG. 1, the cutting and photolytic process is accomplished by removing the explosive with a solvent jet and conducting the mixture of organic solvent and organic and/or nitrogenous component through a closed photolytic system. Temperature control of the explosive-solvent mixture is a feature of this process such that above the line A of FIG. 1, increased solvent temperature will enhance explosive solubility and below the line A of FIG. 1, reduced temperature relative to ambiant will desensitize explosive reactivity. An explosive component storage tank and a reserve solvent tank feed the mixing chamber the desired ratio of further solvent and explosive component. The explosive component storage tank also functions as the metal and inorganic powder sludge holding tank. The sludge can be removed through an outlet valve at the bottom of the tank. The mixture and any initiators and/or inducers as well as oxidants are then individually fed into a premix tank. As shown in FIG. 2, from the premix tank, the mixture is filtered and passed through a bank of coiled UV transparent tubing wound around a bank of UV light sources bulbs of appropriate wavelength. The coils are inter-linked in series with each other to provide an efficient rate of conversion to byproducts. The byproducts are gases and water. Returning to FIG. 1, the outlet portion of the photolysis tubing provides for an outgassing port and a separation valve for the aqueous solution of byproducts. Appropriate conductance and volumetric devices may be coupled with the outgassing port and separation valve to determine the quantity of byproducts being generated. The flow rate of the mixture is adjusted according to the rate of byproducts generated. In this fashion, the introduction of organic and nitrogenous components is balanced to make up for the amount calculated to be completely converted by the rate of byproducts generated.

Alternatively, the mixture from the outlet portion of the coil can be recycled to rephotolyze unreacted organic and nitrogenous components. The gases and aqueous byproducts are drawn off through the out gassing port and separation valve followed by reintroduction of the mixture. The main tank is monitored as to the concentration of the mixture and supplemental explosive is added as the concentration decreases.

Figure 4:
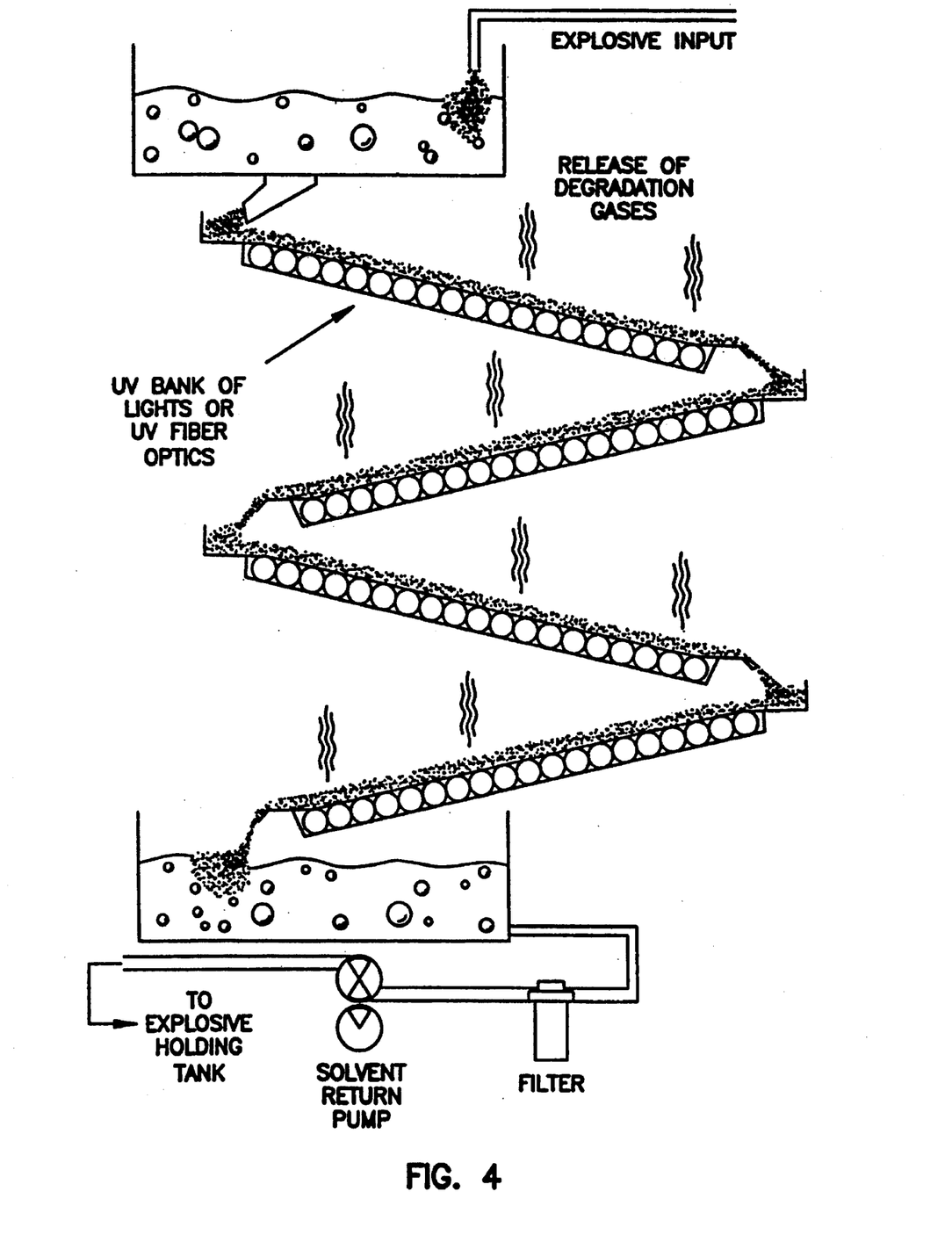
FIG. 4 is a drawing of a cascade irradiation device using an optical fiber network or UV lights.
Figure 5:
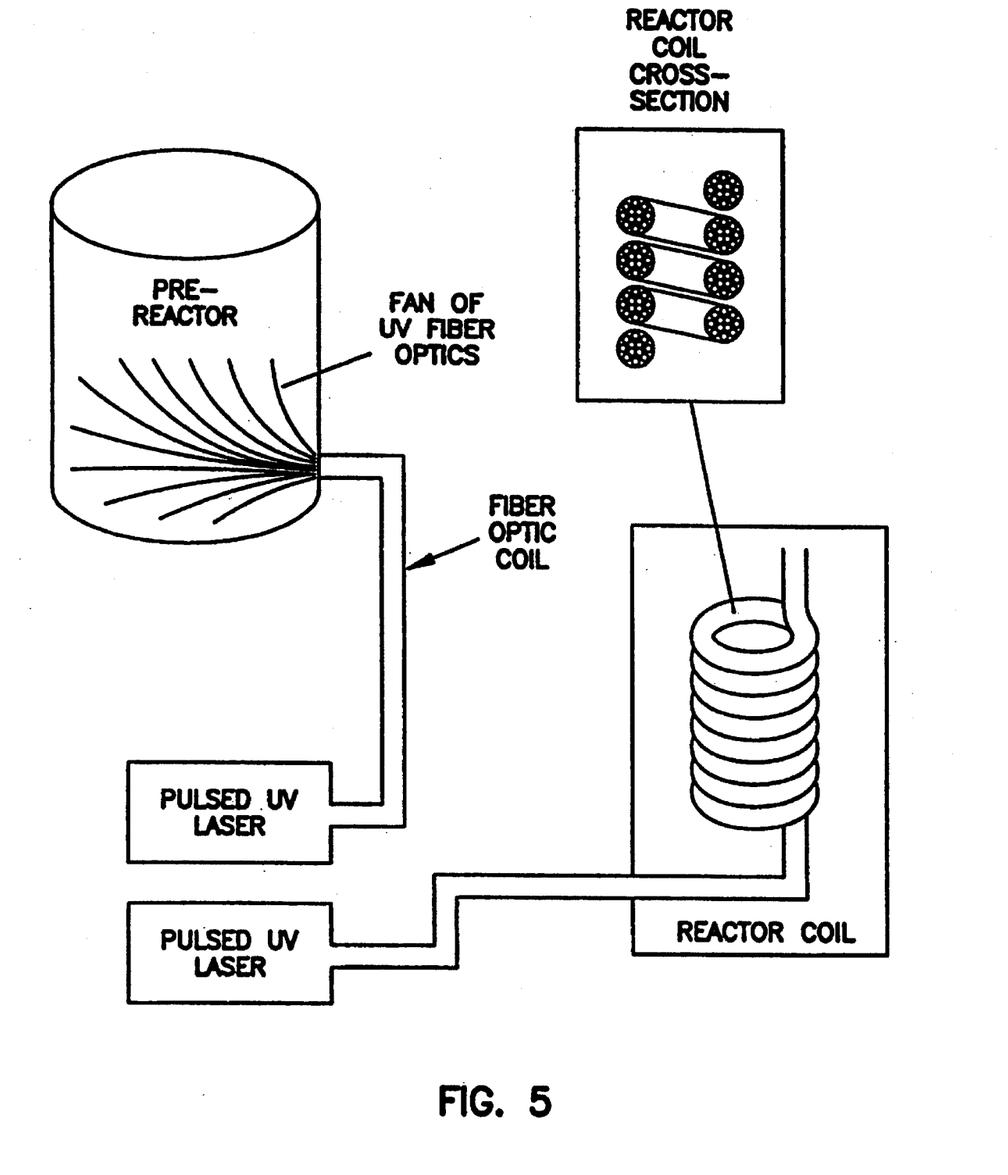
FIG. 5 is the schematic representation of a photolytic process with fiber optics in accordance with one aspect of the invention.

In an alternative or additional design for the photolytic reactor as shown in FIG. 5, a UV pulsed laser may be used to deliver the UV irradiation through a network of quartz glass fiber optic lines arranged throughout an open holding tank or with a cascade apparatus for the solution and/or suspension of organic and nitrogenous components and organic solvent. In this manner, slurried amounts of explosive components in addition to those dissolved in the organic solvent can be photolyzed. Typically, this alternative will utilize a suspension or slurry of small particles of the explosive components in the organic solvent. The cascade design is shown in FIG. 4. The optical fibers are designed to release their energy to the cascading solution or suspension. The holding or cascade tank can be constructed to handle batch portions of solutions or suspensions or to carry a continuous flow of solution or suspension slowly past the network of fiber optic coils. With the addition of other lasers with varied wavelengths, the treatment of the solution or suspension may be tailored to provide a maximized conversion rate. The use of a pulsed laser and the optic fibers allows greater control and minimizes chances for catastrophic failure of the reactor due to any localized exothermic reaction of the solution. The open tank design also permits rapid release of large quantities of gaseous byproducts without gas pressure increases that would interfere with solution or slurry flow or the photolysis process.

The chamber UV reactor can be used in addition to the fiber optic network in the holding tank or cascade to photolyze any remaining quantity of explosive. The solution irradiated by the fiber optic network cascade would subsequently be passed through the UV reactor for a second irradiative treatment. In this fashion, large quantities of gaseous photolytic products would be removed in the open system using the fiber optic network and the more efficient chamber UV reactor would contain the smaller amount of gaseous photolytic product from the second irradiative treatment until the gases could be evacuated from the chamber outlet.

EXAMPLES

Although the present invention will now be described by reference to certain preferred embodiments, those with skill in the art will recognize that many modifications may be made therein without departing from the spirit and scope of this invention.

Example 1

Cutting of Munition

This example sets forth a preferred procedure for use of a high pressure jet to remove the explosive from the munition.

The specifications of the munition are determined in order to mark the appropriate positions for cutting of the casing and excavation of the explosive. For a 30 mm cannon shell of casing thickness 4 mm at the base end, a submerged cutting jet of a mixture of diesel fuel and acetonitrile at a pressure of 150,000 psi is applied to cut a line of a depth of 3.8 mm around the base section of the munition. After the first cut is complete, the pressure of the jet is reduced to 25,000 psi and the remaining thickness of casing along the cut line is removed.

The severed base section is removed to reveal the RDX, aluminum and wax explosive packed in the head of the munition. The solvent jet at 15,000 psi is trained on the surface of the explosive RDX to slice and excavate it. The pieces of excavated explosive and fluid from the jet are collected in a depository tank positioned below the munition. The depository tank also contained a residual amount of solvent to cover the pieces of explosive that drop into the tank. The excavated explosive in the tank is slowly stirred to form a suspension the RDX and other organic components and a sludge of the aluminum metal. Periodically, the stirring is stopped to allow the sludge to settle to the bottom of the depository tank. The settled sludge is removed through a bottom drain in the holding tank. Additional solvent is added to the tank as solvent is removed through the drain. After the removal of explosive is complete and all explosive has been collected in the depository tank, additional acetonitrile is added with stirring to dissolve the remaining solid portions of organic components of the explosive. The sludge is again drained from the bottom of the depository tank and the remaining solution is pumped through a filter into a photolysis holding tank in preparation for photolysis.

Example 2

Photolysis of RDX

This example sets forth a preferred procedure for photolysis of the explosive hexahydro-1,3,5-trinitro-1,3,5-triazine (RDX). The protocol can be used generally for all secondary explosives.

A solution of RDX in a mixture of 50:50 v/v methylene chloride and acetonitrile may be prepared by dissolving about 1 kg. RDX in 10 L of the solvent mixture to yield a 10 percent by weight solution of RDX in the solvent mixture. The solution may be held in a holding tank fitted with pressurized inlet and outlet lines to deliver further photolysis components to the tank and the solution to the photolysis reactor.

The continuous cycle photolysis reactor can be constructed of a quartz glass reaction vessel with a central well for a cold cathode mercury vapor lamp of 20 or more watts per foot output. The vessel is fitted with an inlet port for connection to the solution delivery line, a system of internal baffles and fitted partitions for slowing the flow of the solution, a fitted outlet for gaseous byproducts and a liquid outlet port opposite the inlet port for removal of photolyzed solution.

To study the photolysis, the solution may be pumped from the holding tank to the photolysis vessel at various rates to determine the rate of flow needed to achieve essentially complete photolysis of the RDX. The mercury lamp is switched on once the solution began to flow in the reaction vessel. The photolyzed solution exiting the outlet port can be transported to a high pressure liquid chromatography (HPLC) apparatus to determine the amount of RDX remaining. Alternatively, the volume of exiting byproduct gases and of byproducts contained in the solvent can be determined by ordinary conductance methods such as those used in conjunction with the output of gas chromatographs.

Example 3

Photolysis with Various Solvents

In this experiment, high and low concentrations of each combination of solvent (acetonitrile, methanol and kerosene) and explosive (HMX, RDX and TNT) were UV irradiated and the reactions studied to determine the amount of the unreacted explosive.

Experimental:

Explosives were received from Alliant Techsystem Proving Ground (ATPG) and were Military Specification, warhead grade materials. The kerosene was distilled and blended to ASTM-D3699, K-1 requirements. Reagent grade solvents were used as received. "Concentrate" solutions were made by saturating the solvent with the explosive at 22° C. "Diluted" samples were prepared by diluting the concentrate by a ratio of 1:2.5 with solvent. Aliquots of the concentrates and diluted solutions were exposed to ultra violet light (254 um) in a quartz helix (25 mm ID), tubing:6 mm OD wall 1 mm. The solution was not stirred and the exposure time was 15 minutes.

Samples of the diluted, exposed diluted and exposed concentrates were analyzed for HMX, TNT and RDX where appropriate. The initial concentrate concentrations were calculated from diluted samples. Standards of HMX, RDX and Octol 70/30 were prepared with concentrations of 107, 113 and 167 ppm respectively.

Samples of the starting and photolyzed solutions were analyzed using a Waters HPLC 10 ul, 25 cm Novapak $C_{18}$, MeOH/$H_2O$ 70/30(v/v), 1 ml/min, 55° C., 240 nm.

Discussion:

The data from the experiments are displayed in Table I. The data show that for HMX the best solvent was acetonitrile (AN) followed by methanol (MeOH) and kerosene (K-1). The same order is true for TNT and RDX. K-1 kerosene dissolved only TNT to a significant extent.

Of the explosives used in these experiments, TNT appeared to be the most soluble in any of the solvents followed by RDX and then HMX. In AN, the saturated HMX concentration was about 12450 ppm or 1.6%. The saturated TNT concentration in AN was about 56221 ppm or 7.2%.

The presence of TNT increases the solubility of HMX in both AN and K-1, MeOH reduced it.

The pure solutions of RDX and HMX in any solvent is very susceptible to almost complete photolytic destruction based on the concentrations and exposure times given in Table I. The presence of TNT did not inhibit the destruction of HMX in K-1 and MeOH but appeared to slow HMX destruction in the AN. These data also show the stability of TNT in all solutions except the AN concentrate.

The best solvent for these explosives appears to be acetonitrile followed by methanol and kerosene. Destruction of the explosives in these solvents occurs very readily without additional free radical agents. The highest concentration measured was 7.2% (w/w) of TNT in acetonitrile.

TABLE I

| Sample | Explosive Initial PPM HMX | Final PPM HMX | Change % | Initial PPM TNT | Final PPM TNT | Change % | Initial PPM RDX | Final PPM RDX | Change % |
|---|---|---|---|---|---|---|---|---|---|
| SOLVENT: ACETONITRILE | | | | | | | | | |
| Concentrate 1 | 7,858 | 574 | −93 | | | | | | |
| Diluted 1 | 3,143 | ND | −100 | | | | | | |
| Concentrate 4 | 12,450 | 9,718 | −22 | 56,221 | 36,126 | −36 | | | |
| Diluted 4 | 4,980 | 3,471 | −30 | 22,489 | 18,819 | −16 | | | |
| Concentrate 7 | | | | | | | 17,974 | 2,586 | −86 |
| Diluted 7 | | | | | | | 7,190 | ND | −100 |
| SOLVENT: KEROSENE | | | | | | | | | |
| Concentrate 10 | 0.85 | 0.20 | −76 | | | | | | |
| Diluted 10 | 0.34 | 0.08 | −76 | | | | | | |
| Concentrate 11 | 4.90 | ND | −100 | 1,438 | 971 | −32 | | | |
| Diluted 11 | 1.96 | ND | −100 | 575 | 112 | −81 | | | |
| Concentrate 12 | | | | | | | 4.45 | 0.76 | −83 |
| Diluted 12 | | | | | | | 1.78 | ND | −100 |
| SOLVENT: METHANOL | | | | | | | | | |
| Concentrate 3 | 71 | ND | −100 | | | | | | |
| Diluted 3 | 28 | ND | −100 | | | | | | |
| Concentrate 6 | 46 | 0.48 | −99 | 7,384 | 4,118 | −44 | | | |
| Diluted 6 | 18 | ND | −100 | 2,953 | 149 | −95 | | | |
| Concentrate 9 | | | | | | | 1,023 | ND | −100 |
| Diluted 9 | | | | | | | 409 | ND | −100 |

1 is HMX
3 is HMX
4 is HMX/TNT
6 is HMX/TNT
7 is RDX
9 is RDX
10 is HMX
11 is HMX/TNT
12 is RDX

What is claimed is:

1. An apparatus for removing an explosive composition contained in a casing of a munition, comprising:

means for cutting the munition casing with a pressurized flow of organic solvent to expose the explosive composition and to excavate the explosive composition from the munition; and, means for collecting the excavated explosive and organic solvent to produce a mixture of the explosive in the organic solvent;

the means for collecting being in fluid connection with the means for cutting.

* * * * *